UNITED STATES PATENT OFFICE.

JOHN B. MOSZCZENSKI, OF NEW YORK, N. Y., ASSIGNOR TO TARTAR CHEMICAL COMPANY, OF JERSEY CITY, NEW JERSEY, A CORPORATION OF NEW JERSEY.

MANUFACTURE OF CREAM OF TARTAR.

1,120,839.  Specification of Letters Patent.  Patented Dec. 15, 1914.

No Drawing.  Application filed January 28, 1911.  Serial No. 605,147.

*To all whom it may concern:*

Be it known that I, JOHN B. MOSZCZENSKI, a citizen of the United States, residing in the borough of Brooklyn, city and State of New York, have invented new and useful Improvements in the Manufacture of Cream of Tartar, of which the following is a specification.

The invention relates to a new process for the manufacture of cream of tartar and has for its object the commercial production of cream of tartar from argols, lees, and similar material, with greater efficiency and economy.

The process comprises the use of solutions of chemicals of such character as to assist in extracting the potassium bitartrate from the material containing it and, upon change of temperature, permit the bitartrate to cystalize out; and it is preferably practised so that after the cystallization both the potassium bitartrate and the mother-liquor are left substantially unchanged, the latter being fit for use over and over again in the same manner.

By this process the amount of potassium bitartrate extracted in one operation with a certain volume of liquor is considerably larger (being in fact several times as large) than when the usual process of using water alone for dissolving is followed and at the same time the chemicals used involve little expense, being available for repeated use, only small quantities being lost mechanically in the process of manufacture.

The chemicals used should be adapted to the purpose. Solutions of the alkali-salts of those acids which precipitate bitartrate of potassium from neutral potassium tartrate solutions and which do not dissolve potassium bitartrate are desirable. Many acids precipitate the bitartrate from neutral tartrate solutions and also dissolve the bitartrate. A salt of an acid which precipitates but does not dissolve should be employed. And I prefer to use solutions of potassium, ammonium or sodium acetate, which I have discovered dissolve considerable quantities of potassium bitartrate in heat, these quantities being greater than water alone will take up, and on cooling permit most of the bitartrate so dissolved to crystallize out in an unchanged condition, leaving the mother-liquor almost unchanged and fit for use over and over again in the same manner.

It may be noted that when salts of other bases than potassium are used in practising the process—as when ammonium acetate is used—there is the possibility that some of the tartrate in solution may crystallize out as a salt of such base, for example, as ammonium bitartrate, or the like, and in order that all tartrate may crystallize as potassium bitartrate and to prevent some crystallizing otherwise, it may be desirable to add a small amount of an agent to counteract this tendency, as, for example, a small quantity of a potassium salt.

Specifically to illustrate the practice of the process: A solution may be made of water and sodium acetate. This solution is preferably about 20% acetate, but it may vary within wide limits. The temperature of the solution is raised to the boiling point and the argols or other materials introduced therein. The potassium bitartrate which goes into solution may then be separated from the undissolved residue by any convenient method, as, for example, the usual method of pressing. As the solution cools, preferably while being stirred, the potassium bitartrate will crystallize and separate, the acetate (being much more soluble) remaining in solution. The mother-liquor containing the acetate in solution may then be again used by being raised in temperature, fresh argols or other materials being introduced therein, and the process thus repeated or made continuous.

It will be understood that the solution upon the potassium bitartrate being dissolved therein will contain in addition to the potassium bitartrate some impurities taken up from the raw material and some calcium tartrate. Various methods are known for converting and making use of the calcium tartrate and any suitable method may be conveniently used in treating the mother liquor of the crystallization in connection with the process when desired.

There are many advantages connected with the process in addition to its direct advantages in efficiency and economy. For example, according to the method now largely used, the bitartrate of potassium upon crystallization from its solution in hot water is again dissolved for purposes of improving its color by bleaching or otherwise. The process of my invention is such that a decolorizing agent (as, for example, bone-black) may be introduced to the solution containing the potassium bitartrate when it is separated from the undissolved residue and thus the redissolution now commonly practised may be avoided.

So far as I know, my process in its essence is broadly new.

I claim:—

1. A process for manufacturing cream of tartar comprising subjecting material containing potassium bitartrate to the action of a solution of sodium acetate, at high temperature, to dissolve the potassium bitartrate, and then cooling the solution containing the dissolved potassium bitartrate to permit the crystallization thereof.

2. A process for manufacturing cream of tartar comprising subjecting material containing potassium bitartrate to the action of a solution of an acetate, at high temperature, to dissolve the potassium bitartrate, and then cooling the solution containing the dissolved potassium bitartrate to permit the crystallization thereof.

3. A process for manufacturing cream of tartar comprising subjecting material containing potassium bitartrate to the action of a solution of a salt of an acid which precipitates bitartrate of potassium from neutral potassium tartrate solution and does not dissolve potassium bitartrate, at high temperature, to dissolve potassium bitartrate in such solution, and then cooling the solution containing the dissolved potassium bitartrate to permit the crystallization thereof.

4. A process for manufacturing cream of tartar comprising subjecting material containing potassium bitartrate to the action of water containing a substantial amount of salt which increases the solvent action thereof for the said bitartrate, at high temperature to dissolve the potassium bitartrate, and then cooling the solution containing the dissolved potassium bitartrate to permit the crystallization thereof.

5. A process for manufacturing cream of tartar comprising making a water solution of an alkali metal salt which increases the solvent power of such water for potassium bitartrate, introducing materials containing potassium bitartrate thereto at high temperature to dissolve the potassium bitartrate therein, separating the potassium bitartrate in solution from the undissolved residue, cooling the solution and crystallizing out the potassium bitartrate.

6. A continuous process for manufacturing cream of tartar comprising subjecting material containing potassium bitartrate to the action of a solution containing a substantial quantity of another salt having a solvent action upon bitartrate at high temperature, cooling the solution containing potassium bitartrate and obtaining the potassium bitartrate by crystallization, raising the temperature of the mother-liquor and subjecting fresh supplies of such raw material to the action thereof.

7. A continuous process for manufacturing cream of tartar comprising subjecting material containing potassium bitartrate to the action of a solution of sodium acetate, at high temperature, cooling the solution containing potassium bitartrate and obtaining the potassium bitartrate by crystallization, raising the temperature of the mother-liquor and subjecting fresh supplies of such raw material to the action thereof.

8. A continuous process for manufacturing cream of tartar comprising subjecting material containing potassium bitartrate to the action of a solution containing a salt of an acid which precipitates bitartrate of potassium from neutral potassium tartrate solution and does not dissolve potassium bitartrate, at high temperature, cooling the solution containing potassium bitartrate and obtaining the potassium bitartrate by crystallization, raising the temperature of the mother-liquor and subjecting fresh supplies of such raw material to the action thereof.

9. In the manufacture of cream of tartar, the process which comprises subjecting materials containing potassium bitartrate to a solution of a salt more soluble than potassium bitartrate which will dissolve greater quantities of potassium bitartrate than water when heated while allowing it to crystallize when cooled.

10. In the manufacture of cream of tartar, the process which comprises subjecting materials containing potassium bitartrate to the action of a solution of a salt of an alkali more soluble than potassium bitartrate in the same solution which will dissolve the potassium bitartrate when heated and allow it to crystallize when cooled.

JOHN B. MOSZCZENSKI.

Witnesses:
  CORALIE CHOATE,
  HERMAN GUSTOW.

Copies of this patent may be obtained for five cents each, by addressing the "Commissioner of Patents, Washington, D. C."